(12) United States Patent
O'Donnell et al.

(10) Patent No.: US 12,079,048 B2
(45) Date of Patent: Sep. 3, 2024

(54) DYNAMICALLY ILLUMINATED ELEMENT ON INFORMATION HANDLING SYSTEM BEZEL

(71) Applicant: Dell Products L.P., Round Rock, TX (US)

(72) Inventors: Sean P. O'Donnell, Poughkeepsie, NY (US); Richard Crisp, Austin, TX (US); Matthew B. Gilbert, Austin, TX (US); Scott C. Lauffer, Austin, TX (US); Timothy M. Lambert, Austin, TX (US); Libertad Paloma Escobar Carrizales, Austin, TX (US); Peter Kaltenbach, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 399 days.

(21) Appl. No.: 17/232,846

(22) Filed: Apr. 16, 2021

(65) Prior Publication Data

US 2022/0334621 A1    Oct. 20, 2022

(51) Int. Cl.
| | | |
|---|---|---|
| *G06F 11/30* | (2006.01) | |
| *G06F 1/18* | (2006.01) | |
| *G06F 11/32* | (2006.01) | |
| *G08B 5/36* | (2006.01) | |
| *G06F 8/65* | (2018.01) | |
| *G06F 9/4401* | (2018.01) | |

(52) U.S. Cl.
CPC ............ *G06F 1/182* (2013.01); *G06F 1/181* (2013.01); *G06F 11/3055* (2013.01); *G06F 11/325* (2013.01); *G08B 5/36* (2013.01); *G06F 8/65* (2013.01); *G06F 9/4401* (2013.01)

(58) Field of Classification Search
CPC ....... G06F 1/182; G06F 1/181; G06F 11/3055; G06F 11/325; G06F 8/65; G06F 9/4401; G08B 5/36
See application file for complete search history.

(56) References Cited

U.S. PATENT DOCUMENTS

| | | | | |
|---|---|---|---|---|
| 7,145,776 B2* | 12/2006 | King, Jr. | ............... | G11B 33/128 |
| 7,362,565 B2* | 4/2008 | Imblum | ............... | G11B 33/142 |
| 9,377,808 B1* | 6/2016 | Sivertsen | ................ | G06F 1/181 |
| 9,420,718 B2* | 8/2016 | Du | ........................... | G06F 1/183 |
| 11,200,920 B1* | 12/2021 | Chang | ................. | G11B 33/022 |
| 11,556,156 B2* | 1/2023 | Norton | ..................... | H05K 7/14 |
| 2010/0254096 A1* | 10/2010 | Kim | ........................ | G06F 1/185 |
| | | | | 361/737 |

* cited by examiner

*Primary Examiner* — Anthony Q Edwards
*Assistant Examiner* — Hung Q Dang
(74) *Attorney, Agent, or Firm* — Jackson Walker L.L.P.

(57) ABSTRACT

A bezel configured to mechanically couple to a housing for housing components of an information handling system may include one or more mechanical features for mechanically coupling the bezel to the housing, an illuminated element module mechanically coupled to a mechanical structure of the bezel, and a bezel connector having a plurality of pins communicatively coupled to the illuminated element module, the bezel connector configured to communicatively couple the illuminated element module to an access controller of the information handling system housed within the housing, such that the illuminated element module receives instructions from the access controller for displaying a visual behavior relating to a status of the information handling system and displays the visual behavior in response to receiving the instructions.

15 Claims, 10 Drawing Sheets

DYNAMICALLY ILLUMINATED ELEMENT ON INFORMATION HANDLING SYSTEM BEZEL

TECHNICAL FIELD

The present disclosure relates in general to information handling systems, and more particularly to systems and methods for coupling a dynamically illuminated element, in which the dynamically illuminated element is disposed in an information handling system bezel.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system datacenters often include tens to hundreds of rack enclosures—each containing multiple servers, storage devices, and network switches. Each server may include one or more visual indicators (e.g., light emitting diodes) that present information to users (e.g., administrators/information technology technicians, etc.). In some instances, this information presentation from numerous sources may create cognitive overload for a user which may lead to the user requiring significant time to diagnose any problems due to all of the visual noise. In particular, it may be challenging for a user to identify an individual faulted information handling server within a datacenter. Accordingly, systems and methods which enable an information handling system to effectively communicate visual information to a user are desired.

SUMMARY

In accordance with the teachings of the present disclosure, the disadvantages and problems associated with existing approaches to management and administration of multiple information handling systems in a datacenter may be reduced or eliminated.

In accordance with embodiments of the present disclosure, a bezel configured to mechanically couple to a housing for housing components of an information handling system may include one or more mechanical features for mechanically coupling the bezel to the housing, an illuminated element module mechanically coupled to a mechanical structure of the bezel, and a bezel connector having a plurality of pins communicatively coupled to the illuminated element module, the bezel connector configured to communicatively couple the illuminated element module to an access controller of the information handling system housed within the housing, such that the illuminated element module receives instructions from the access controller for displaying a visual behavior relating to a status of the information handling system and displays the visual behavior in response to receiving the instructions.

In accordance with these and other embodiments of the present disclosure, an information handling system may include an access controller and a housing configured to house the access controller, the housing comprising: one or more mechanical features for mechanically coupling a bezel to the housing and a housing connector mechanically mounted on the housing and communicatively coupled to the access controller and configured to engage with a corresponding connector of the bezel in order to communicatively couple an illuminated element module mechanically coupled to the bezel to the access controller, such that the access controller is configured to communicate instructions to the illuminated element module for displaying within the illuminated element module a visual behavior relating to a status of the information handling system.

In accordance with these and other embodiments of the present disclosure, a method may include mechanically coupling a bezel to a housing for housing components of an information handling system and during mechanical coupling of the bezel to the housing, communicatively coupling an illuminated element module mechanically mounted within the bezel to an access controller internal to the housing, such that the illuminated element module receives instructions from the access controller for displaying a visual behavior relating to a status of the information handling system and displays the visual behavior in response to receiving the instructions.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
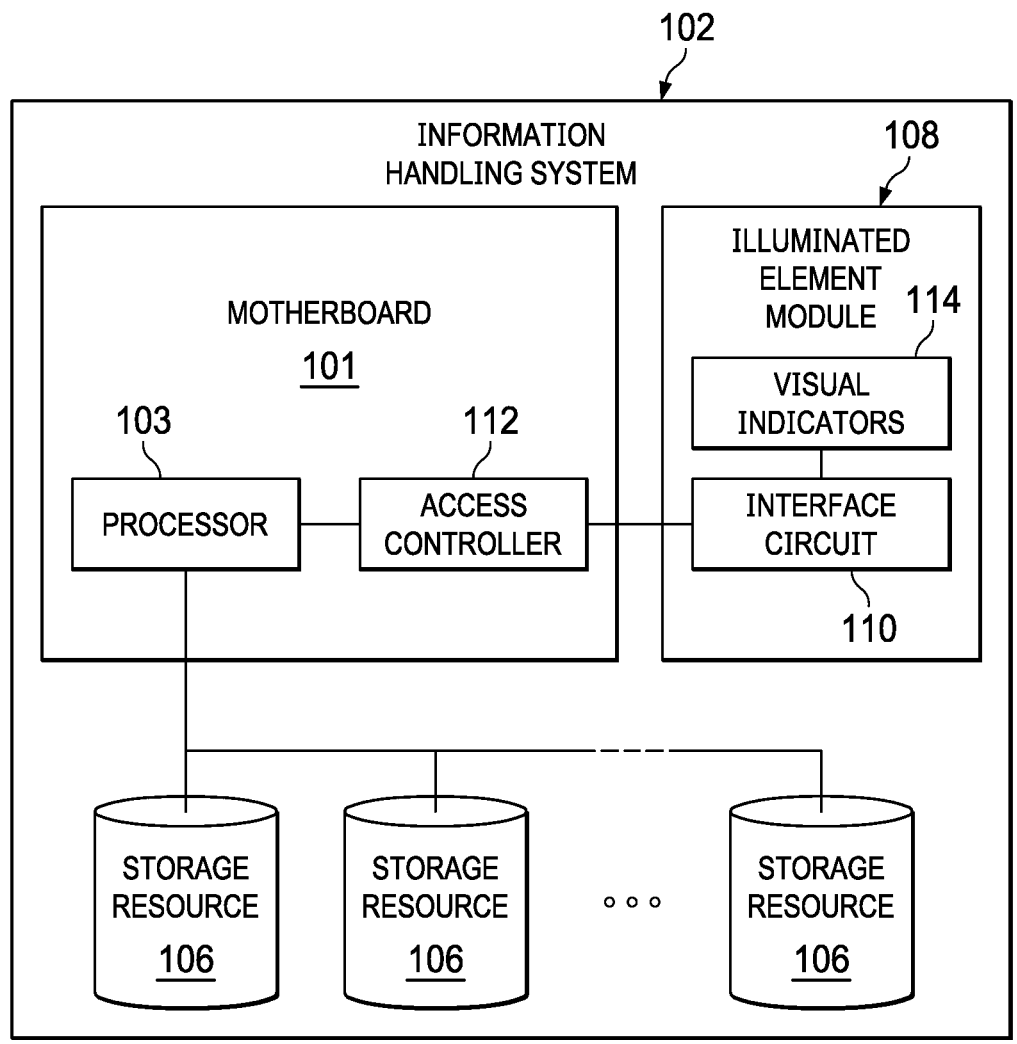
FIG. 1 illustrates a block diagram of selected components of an example information handling system, in accordance with embodiments of the present disclosure.

Preferred embodiments and their advantages are best understood by reference to FIGS. 1 through 10, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a block diagram of an example information handling system 102. In some embodiments, information handling system 102 may comprise a server. In other embodiments, information handling system 102 may comprise networking equipment for facilitating communication over a communication network. In yet other embodiments, information handling system 102 may comprise a personal computer, such as a laptop, notebook, or desktop computer. In yet other embodiments, information handling system 102 may be a mobile device sized and shaped to be readily transported and carried on a person of a user of information handling system 102 (e.g., a smart phone, a tablet computing device, a handheld computing device, a personal digital assistant, etc.).

As shown in FIG. 1, information handling system 102 may include a motherboard 101, one or more storage resources 106, and an illuminated element module 108. Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103 and an access controller 112 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a storage resource 106, memory and/or another component of information handling system 102.

Access controller 112 may be communicatively coupled to processor 103 and may comprise any system, device, or apparatus configured to facilitate management and/or control of components of information handling system 102, information handling systems modularly coupled within, and/or one or more of its component information handling resources. Access controller 112 may be configured to issue commands and/or other signals to manage and/or control information handling resources of information handling system 102. Access controller 112 may comprise a microprocessor, microcontroller, DSP, ASIC, field programmable gate array ("FPGA"), EEPROM, or any combination thereof.

In addition or alternatively, access controller 112 may also provide a management console for user/administrator access to these functions. For example, access controller 112 may provide for communication with a user interface, permitting a user to interact with access controller 112 and configure control and management of components of information handling system 102 by access controller 112. As another example, access controller 112 may act as a proxy and establish communication between two information handling resources by either configuring them to directly couple to each other or transfer information by receiving information from one information handling resource, processing the information if needed, and then transferring the information to the other information handling resource. As a further example, access controller 112 may implement Web Services Management ("WS-MAN") or another suitable management protocol permitting a user to remotely access an access controller 112 to configure information handling system 102 and its various information handling resources. In such embodiments, access controller 112 may interface with a network interface separate from a traditional network interface of information handling system 102, thus allowing for "out-of-band" control of information handling system 102, such that communications to and from access controller 112 are communicated via a management channel physically isolated from an "in band" communication channel with the traditional network interface. Thus, for example, if a failure occurs in information handling system 102 that prevents an administrator from interfacing with information handling system 102 via a traditional network interface and/or user interface (e.g., operating system failure, power failure, etc.), the administrator may still be able to monitor and/or manage information handling system 102 (e.g., to diagnose problems that may have caused failure) via access controller 112. In the same or alternative embodiments, access controller 112 may allow an administrator to remotely manage one or more parameters associated with operation of information handling system 102 and its various information handling resources (e.g., power usage, processor allocation, memory allocation, security privileges, etc.). In certain embodiments, access controller 112 may include or may be an integral part of a chassis management controller (CMC), a baseboard management controller (BMC), Dell Remote Access Controller (DRAC) or an Integrated Dell Remote Access Controller (iDRAC).

Storage resources 106 may be communicatively coupled to processor 103, and may include any system, device, or apparatus configured to retain program instructions and/or data for a period of time (e.g., computer-readable media). Storage resources 106 may include hard disk drives, magnetic tape libraries, optical disk drives, magneto-optical disk drives, compact disk drives, compact disk arrays, disk array controllers, and/or any other system, apparatus or device operable to store media.

Illuminated element module 108 may be communicatively coupled to access controller 112 and may comprise any suitable system, apparatus, or device operable to dynamically illuminate an array of one or more visual indicators 114 in order to communicate visual information to a user. Illuminated element module 108 may include an array of addressable visual indicators 114, arranged in a circle, row, bank, or other suitable manner. Each visual indicator 114 may include one or more light-emitting diodes, or one or more other sources of light.

Illuminated element module 108 may also include an interface circuit 110 communicatively interfaced between access controller 112 and visual indicators 114, in order to allow access controller 112 to control illumination of individual visual indicators 114 of illuminated element module 108, as described in greater detail below.

As also described below, components of illuminated element module 108 may be disposed in a bezel (e.g., a front cover) of information handling system 102.

In addition to motherboard 101, processor 103, storage resources 106, access controller 112, illuminated element module 108, interface circuit 110, and visual indicators 114, information handling system 102 may include one or more other information handling resources.

Figure 2:
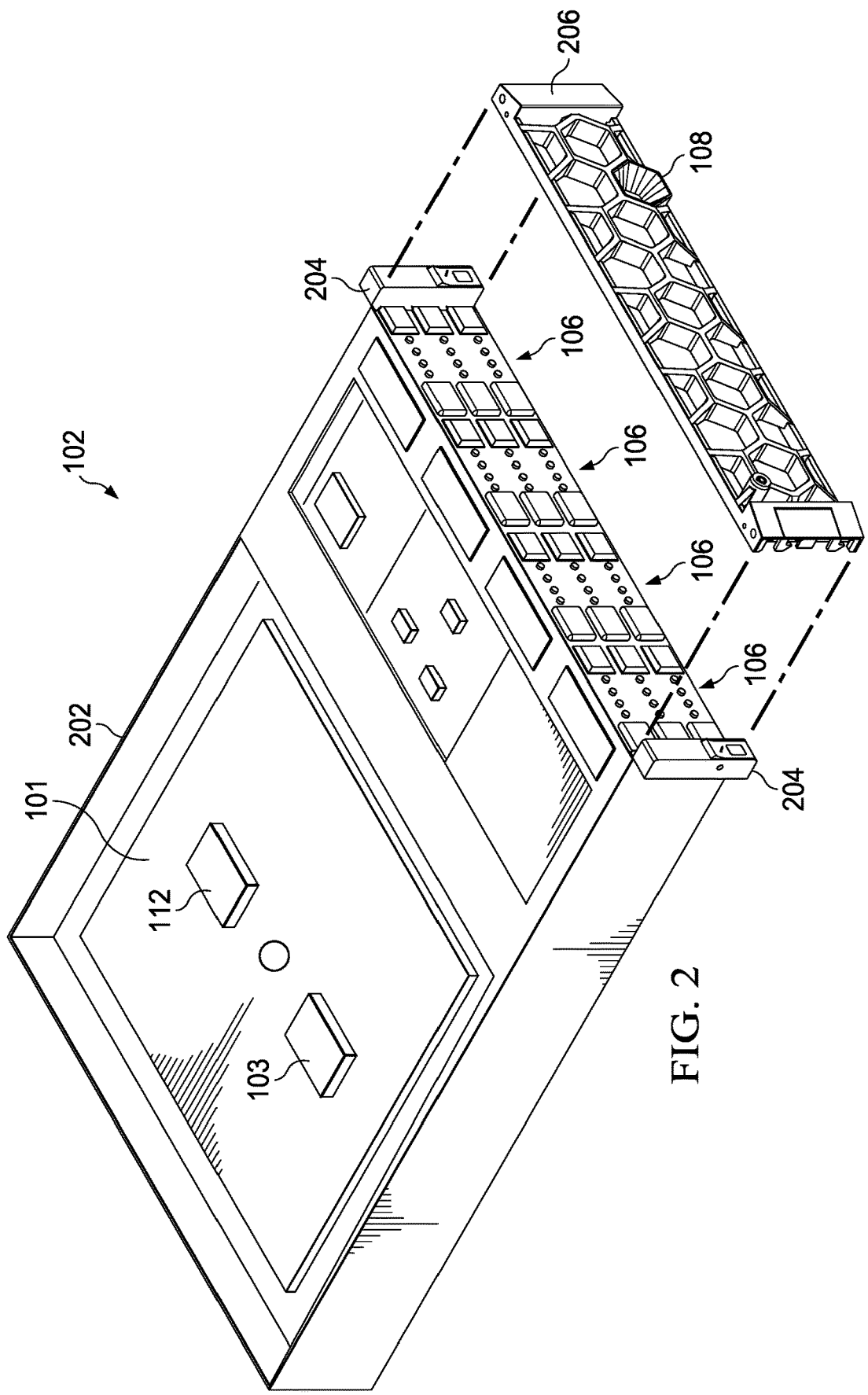
FIG. 2 illustrates a perspective view of selected components of the example information handling system of FIG. 1, in accordance with embodiments of the present disclosure.

FIG. 2 illustrates a perspective view of selected components of information handling system 102, in accordance with embodiments of the present disclosure. As shown in FIG. 2, information handling system 102 may comprise a housing 202 to house components of information handling system 102. In some embodiments, housing 202 may include a chassis or other enclosure including one or more mechanical features for supporting the various components of information handling system 102. In other embodiments, housing 202 may comprise a drawer or tray configured to be inserted into or removed from a server rack for housing multiple information handling systems.

As shown in FIG. 2, housing 202 may include ears 204 and a bezel 206. Bezel 206 may comprise any suitable mechanical structure for covering a front portion of information handling system 102. For example, bezel 206 may cover storage resources 106 for purposes of security and/or aesthetics. As described in greater detail below, bezel 206 may be readily detachable from the remainder of chassis 202 via ears 204. Bezel 206 may also include one or more mechanical features for housing illuminated element module 108.

An ear 204 may include one or more mechanical features for mechanically coupling bezel 206 to the remainder of housing 202 via corresponding mechanical features of bezel 206. In addition, as described in greater detail below, at least one ear 204 and bezel 206 may include corresponding electrically-conductive components permitting illuminated element module 108 to draw power, provide alerts, and/or communicatively couple to access controller 112 when bezel 206 is engaged with ears 204. In embodiments in which housing 202 comprises a drawer or sled, ears 204 may comprise mechanical components to allow a user to slide housing 202 into or out of a rack.

Figure 3A:
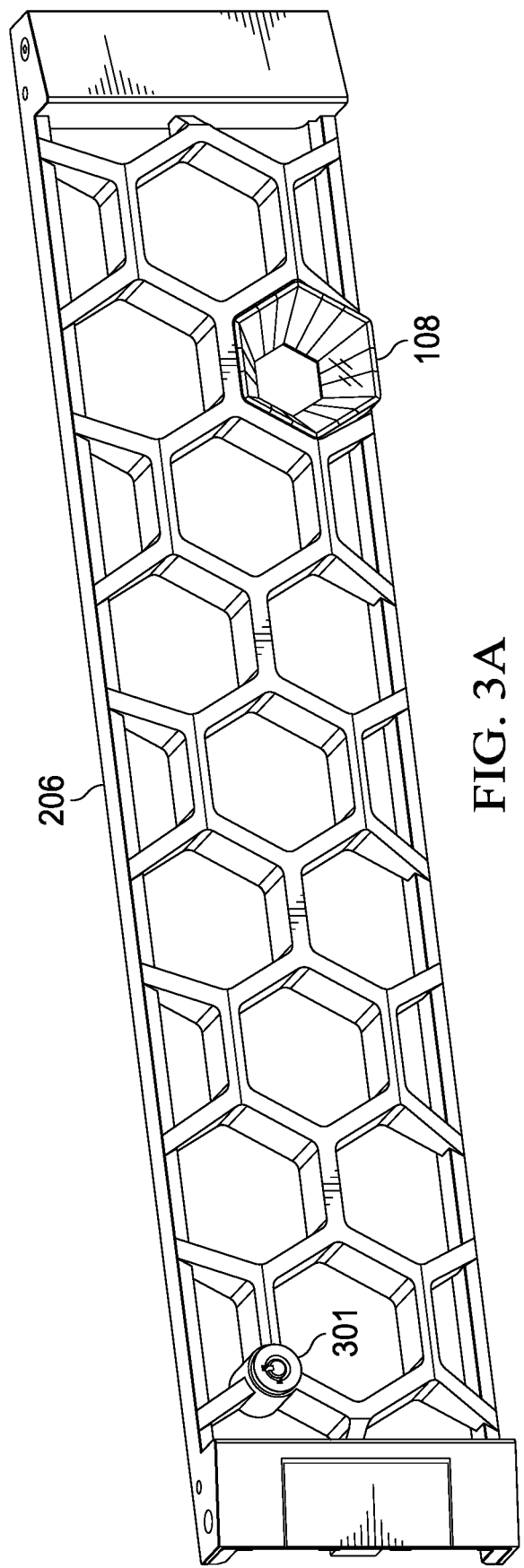
FIGS. 3A and 3B illustrate elevation views of opposite sides of a bezel, in accordance with embodiments of the present disclosure.
Figure 3B:
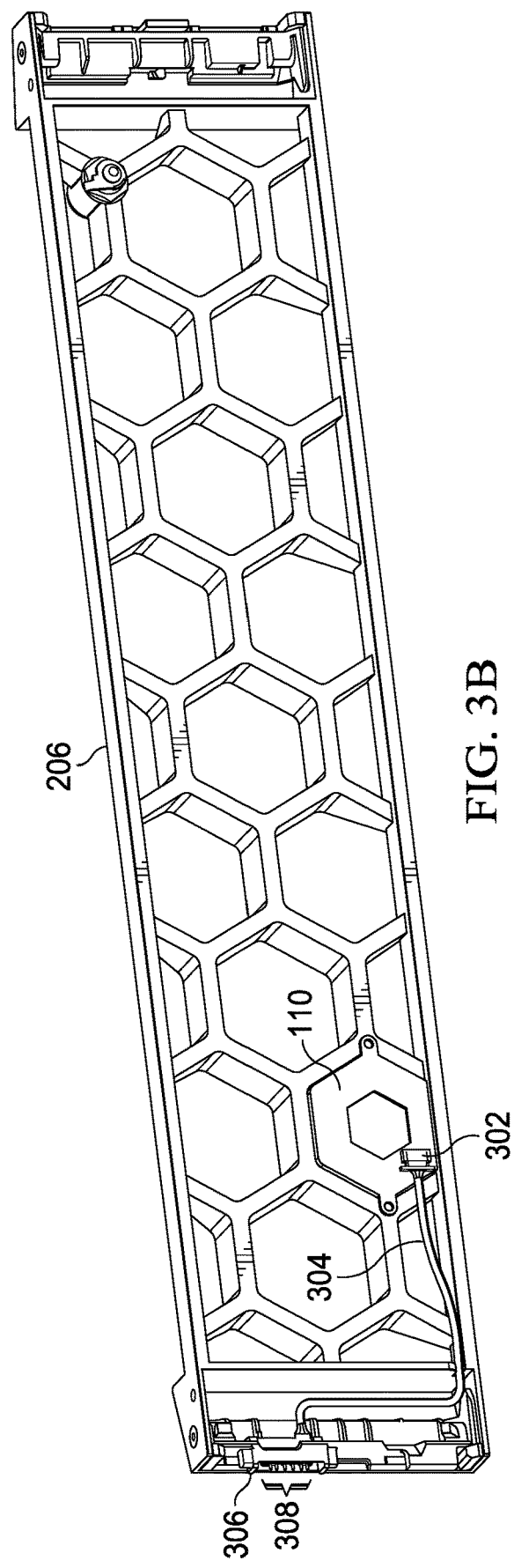

FIGS. 3A and 3B illustrate elevation views of opposite sides of bezel 206, in accordance with embodiments of the present disclosure. FIG. 3A depicts a front of bezel 206 (e.g., the side facing to the exterior of housing 202 when bezel 206 is engaged with ears 204) while FIG. 3B depicts a rear of bezel 206 (e.g., the side facing to the interior of housing 202 when bezel 206 is engaged with ears 204). As shown in FIGS. 3A and 3B, bezel 206 may comprise a lock 301 which may allow a user to mechanically manipulate lock 301 (e.g., with a key) to engage bezel 206 with one of ears 204 to secure bezel 206 in place. Further, as shown in FIGS. 3A and 3B, illuminated element module 108 may be mechanically coupled to bezel 206 via one or more structural features (e.g., guides, posts, screws, snaps, fasteners, adhesives, etc. not explicitly shown in FIGS. 3A and 3B), thus supporting components of illuminated element module 108 within bezel 206.

As also shown in FIGS. 3A and 3B, illuminated element module 108 may comprise a connector 302 configured to electrically and mechanically couple a flexible circuit board 304 having a plurality of conductive traces to illuminated element module 108. In some embodiments, a cable or harness of electrically-conductive wires may be used in lieu of flexible circuit board 304. The conductive traces of flexible circuit board 304 (or the wires of a cable or harness used in lieu thereof) may terminate into a connector 306 at an edge of bezel 206. In some embodiments, connector 306 may comprise a plurality of electrically conductive, spring-loaded pins 308 electrically coupled to conductive traces of flexible circuit board 304 (or the wires of a cable or harness used in lieu thereof).

Figure 4:
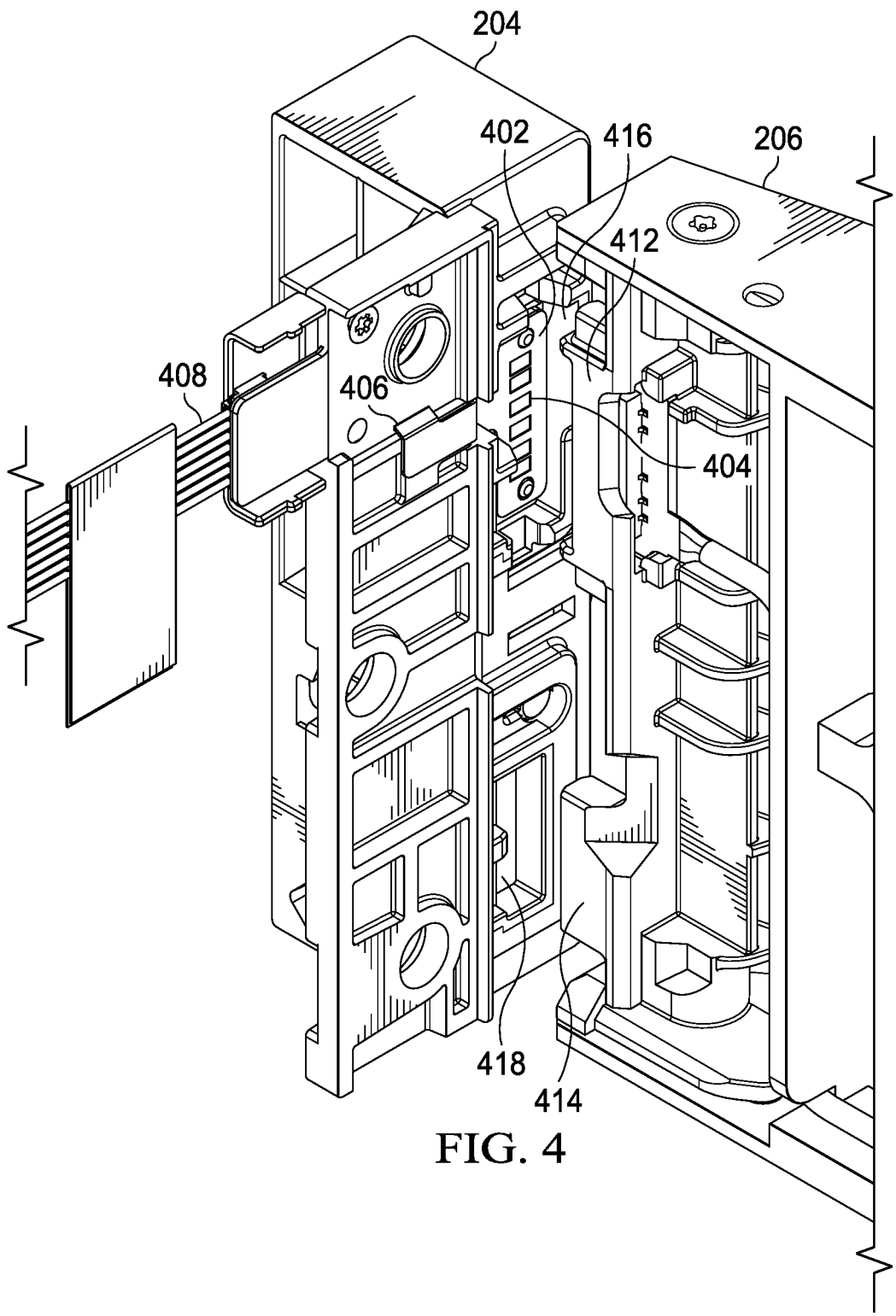
FIG. 4 illustrates detail of a bezel engaging with an ear, in accordance with embodiments of the present disclosure.

FIG. 4 illustrates detail of bezel 206 engaging with an ear 204, in accordance with embodiments of the present disclosure. As shown in FIG. 4, engagement of bezel 206 to the remainder of housing 202 may begin with a user "toe-ing in" mechanical features 412 and 414 of a first end of bezel 206 with corresponding mechanical features 416 and 418 of an ear 204. Such mechanical features may provide mechanical guiding, assisting the user in electrically coupling spring-loaded pins 308 of connector 306 to corresponding contacts 404 of a connector 402 integral to ear 204. Contacts 404 may be configured such that they prevent shorting of pins during insertion, removal, or other movement of bezel 206. For example, contacts 404 may be formed such that power and/or ground pins disconnect before any pin 308 can short to a contact 404 not intended for such pin 308.

Mechanical feature 412 may include or may support connector 308. Likewise, mechanical feature 416 may include or may support connector 402.

Contacts 404 of connector 402 may be electrically coupled to conductive traces of a flexible circuit board 406 (or the wires of a cable or harness used in lieu thereof) which in turn may terminate into a cable 408 configured to electrically couple to conductive traces of a flexible circuit board 406 (or the wires of a cable or harness used in lieu thereof) to a cable 408 (or wiring harness) of electrically conductive wires. After the first end of bezel 206 is engaged with a first ear 204, engagement of bezel 206 to the remainder of housing 202 may be completed by engagement of bezel 206 to a second ear 204.

Figure 5:
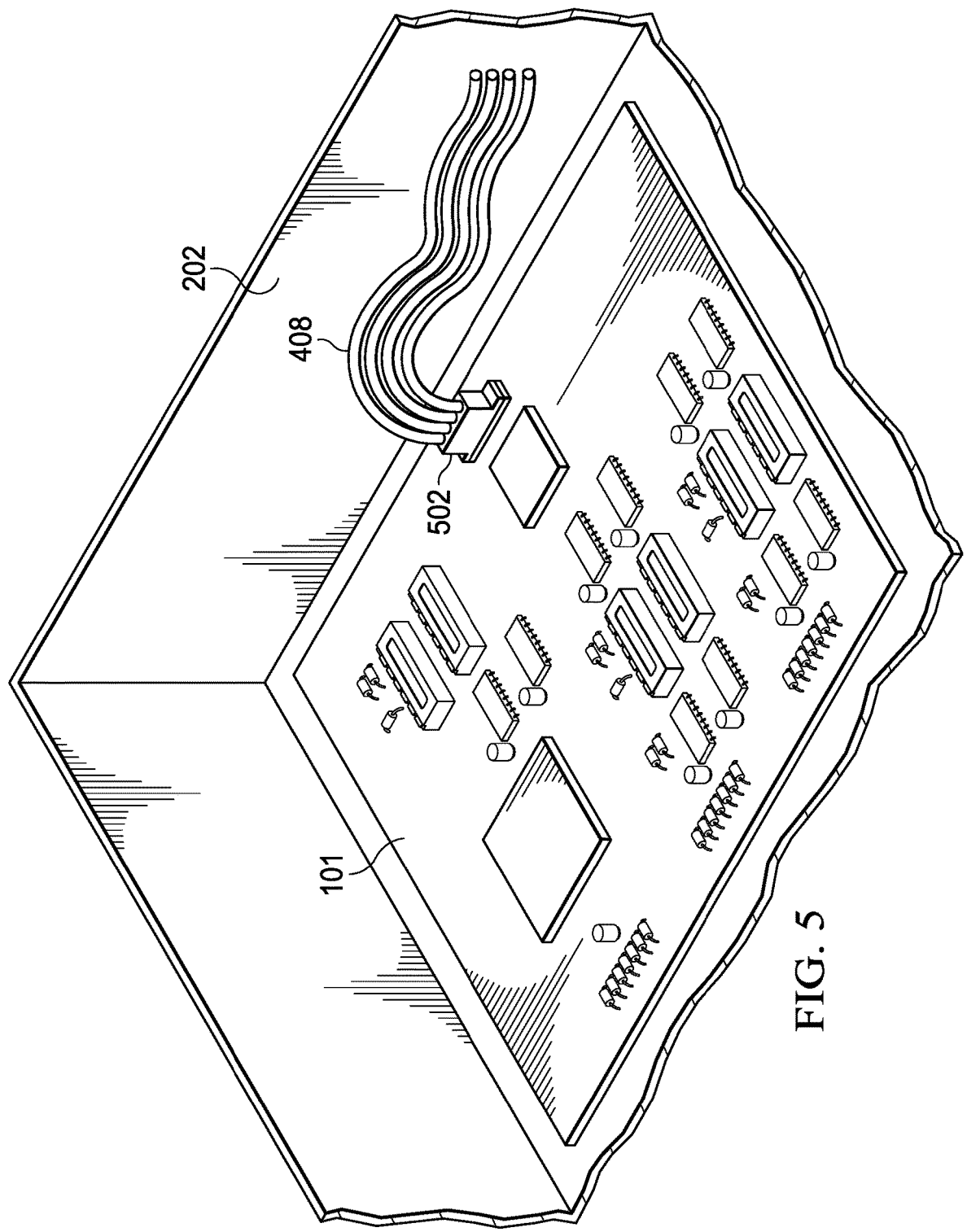
FIG. 5 illustrates detail of a cable coupling to a motherboard, in accordance with embodiments of the present disclosure.

FIG. 5 illustrates detail of cable 408 coupling to motherboard 101, in accordance with embodiments of the present disclosure. As shown in FIG. 5, wires of cable 408 may terminate into a connector 502 having electrically-conductive pins for coupling to corresponding wires of cable 408. Such electrically-conductive pins may in turn be electrically coupled to conductive traces of motherboard 101 which are coupled to access controller 112, thus providing for an electrical communication pathway between access controller 112 and illuminated element module 108.

Although the foregoing discussion contemplates the communicative coupling of wireless communication module 108 housed in bezel 206 to an access controller 112, systems and methods similar or identical to those described herein may be utilized for communicatively coupling any suitable information handling resource mechanically mounted within a bezel to one or more other information handling resources within an information handling system.

Figure 6:
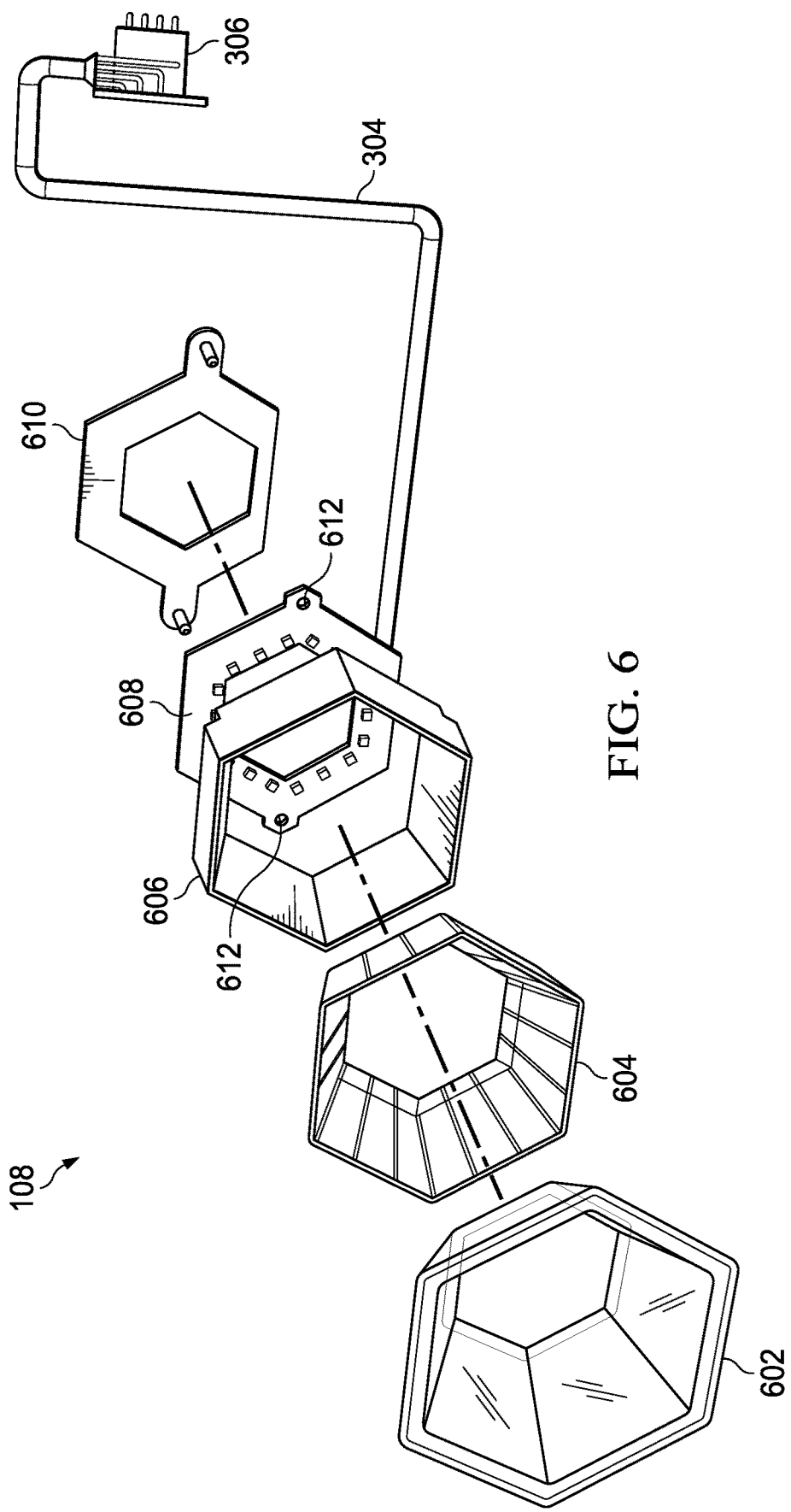
FIG. 6 illustrates an exploded view of an example illuminated element module assembly, in accordance with embodiments of the present disclosure.

FIG. 6 illustrates an exploded view of an example assembly for an illuminated element module 108, in accordance with embodiments of the present disclosure. As shown in FIG. 6, illuminated element module 108 may include a clear lens 602 that may cover a segmented light guide 604. Together, clear lens 602 and segmented light guide 604 may be housed within a metallic housing 606. A printed circuit board 608 comprising interface circuit 110 and visual indicators 114 may cover a backside of metallic housing 606, and a mounting bracket 610 may cover printed circuit board 608 and the backside of metallic housing 606. Each of circuit board 608 and mounting bracket 610 may include openings 612 for receiving fasteners (e.g., screws) for mounting illuminated element module 108 to the reverse side of bezel 206 via features of bezel 206 corresponding to the fasteners. As also shown in FIG. 6, flexible circuit board 304 (or the wires of a cable or harness used in lieu thereof) may be electrically coupled to printed circuit board 608 and terminate into connector 306.

Figure 7:
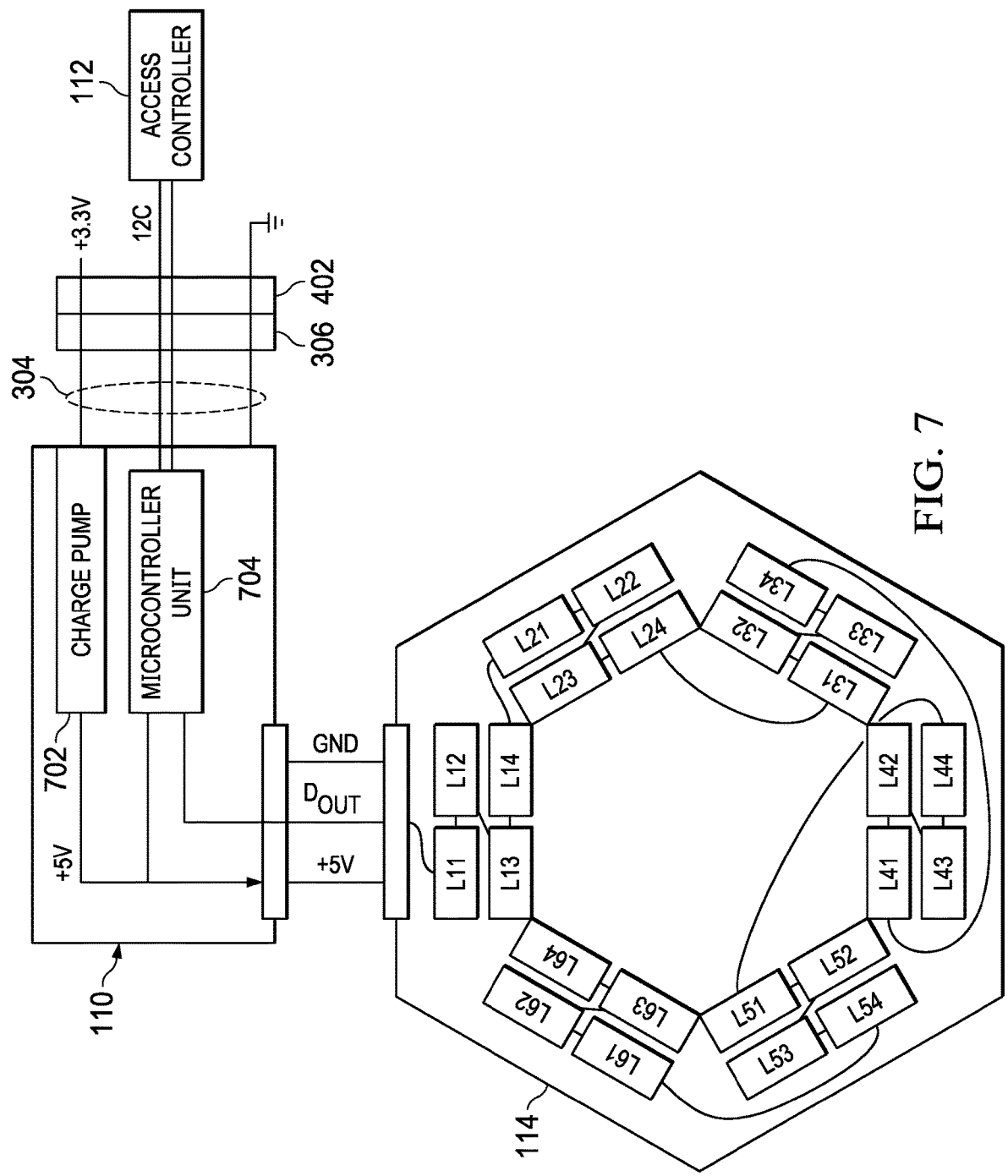
FIG. 7 illustrates a block diagram/circuit diagram of selected components of an information handling system for control of an illuminated element module, in accordance with embodiments of the present disclosure.

FIG. 7 illustrates a block diagram/circuit diagram of selected components of an information handling system for control of an illuminated element module, in accordance with embodiments of the present disclosure. As shown in FIG. 7, interface circuit 110 may comprise a charge pump 702 (or other power converter) and a microcontroller unit 704.

Charge pump 702 (or other power converter) may comprise any suitable system, device, or apparatus configured to convert a direct-current voltage (e.g., 3.3 volts) generated by any suitable power source of information handling system 102 into a higher direct-current voltage (e.g., 5 volts) for powering visual indicators 114 and microcontroller unit 704.

Microcontroller unit 704 may comprise any suitable system, device, or apparatus configured to receive commands from access controller 112 and forward such commands to visual indicators 114 to generate a desired behavior of visual indicators 114, as described in greater detail below. Thus, in operation, access controller 112 may, via an Inter-Integrated Circuit (I2C) or other suitable interface, discover presence of illuminated element module 108. If illuminated element module 108 is discovered, access controller 112 may, via an Inter-Integrated Circuit (I2C) or other suitable interface, communicate appropriate serial patterns to microcontroller unit 704. In turn, microcontroller unit 704 may receive commands from access controller 112 and drive such commands to visual indicators 114.

As shown in FIG. 7, visual indicators 114 may comprise an array of daisy-chained serially-connected individual visual indicators, labeled L11, L12, L13, L14, L21, L22, etc. Visual indicators 114 may be individually addressable (e.g., in accordance with WS2812B protocol) and may be capable of generating any suitable color (e.g., red, green, blue, or combinations thereof resulting in other colors).

Figure 8:
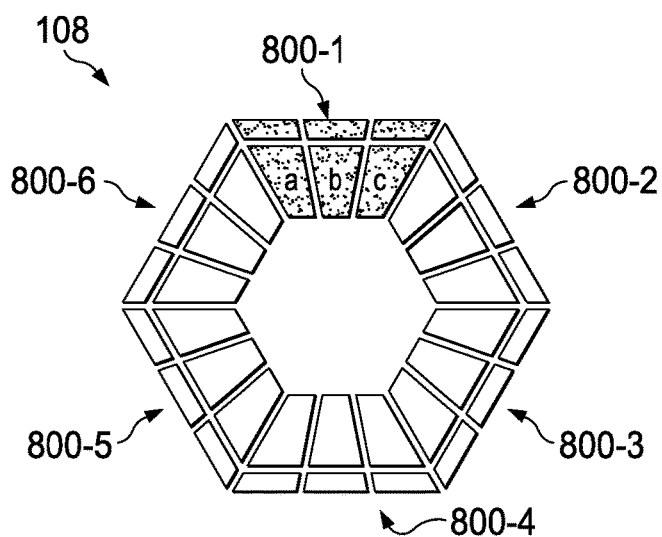
FIG. 8 illustrates an example segmentation of an illuminated element module, in accordance with embodiments of the present disclosure.

FIG. 8 illustrates an example segmentation of illuminated element module 108, in accordance with embodiments of the present disclosure. As shown in FIG. 8, illuminated element module 108 may have a plurality of segments 800 (e.g., segments 800-1, 800-2, 800-3, 800-4, 800-5, and 800-6). Although illuminated element module 108 is depicted in FIG. 8 as being hexagonal in shape and having six segments 800, illuminated element module 108 may be of any suitable shape (e.g., circular, triangular, rectangular, hexagonal, octagonal, decagonal, etc.) and/or may have any suitable number of segments. Also as shown in FIG. 8, each segment 800 may have a plurality of sub-segments, labeled a, b, and c with respect to segment 800-1. Although illuminated element module 108 is depicted in FIG. 8 as having three sub-segments for each segment 800, each segment 800 of illuminated element module 108 may have any suitable number of sub-segments. Each sub-segment may be optically coupled to one or more individual visual indicators 114 in order to generate a desired behavior for such sub-segment.

In operation, as described in more detail below, each segment 800 and/or sub-segment thereof may be dynamically illuminated to a respective color, intensity, blink rate, and/or other visual behavior in order to visually indicate status information and/or other pertinent information regarding information handling system 102.

Figure 9:
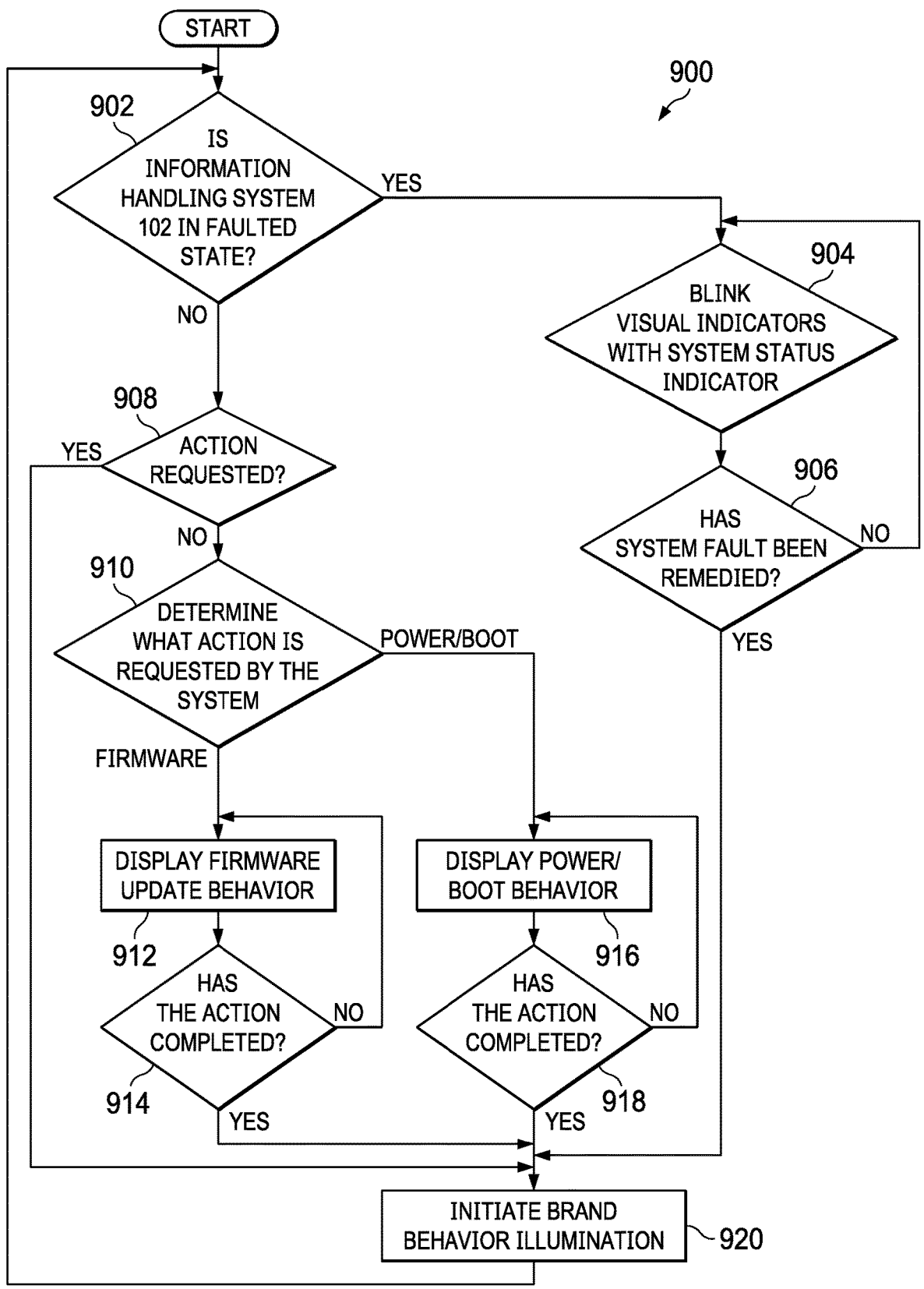
FIG. 9 illustrates a flow chart of a method for controlling visual behavior of an illuminated element module, in accordance with embodiments of the present disclosure.

FIG. 9 illustrates a flow chart of a method 900 for controlling visual behavior of illuminated element module 108, in accordance with embodiments of the present disclosure. According to some embodiments, method 900 may begin at step 902. As noted above, teachings of the present disclosure may be implemented in a variety of configurations of information handling system 102. As such, the preferred initialization point for method 900 and the order of the steps comprising method 900 may depend on the implementation chosen.

At step 902, access controller 112 may determine if information handling system 102 is in a faulted state. If information handling system 102 is in a faulted state, method 900 may proceed to step 904. Otherwise, method 900 may proceed to step 908.

At step 904, in response to determining that information handling system 102 is in a faulted state, access controller 112 may cause visual indicators 114 to blink in accordance with a system status indicator. For example, in response to a faulted state, access controller 112 may cause visual indicators 114 to blink with a certain color (e.g., red, yellow, or orange), rate, and/or intensity based on the fault that has occurred, thus visually indicating to a user a fault has occurred and/or visually indicating to the user the fault or type of fault that has occurred.

At step 906, access controller 112 may determine if the fault has been remedied. If the fault has been remedied, method 900 may proceed to step 920. Otherwise, method 900 may return to step 904.

At step 908, in response to no fault being present, access controller 112 may determine if an action (e.g., firmware update, power on/boot of information handling system 102) has been requested by information handling system 102. If no action is requested, method 900 may proceed to step 920. Otherwise, method 900 may proceed to step 910.

At step 910, access controller 112 may determine which action is requested by information handling system 102. For example, if the action is a firmware update, method 900 may proceed to step 912. As another example, if the action is a powering on or boot of information handling system 102, method 900 may proceed to step 916.

At step 912, access controller 112 may cause a behavior associated with a firmware update to be displayed by visual indicators 114. For example, in some embodiments, access controller 112 may cause all visual indicators 114 to generate solid blue light in response to a firmware update request.

At step 914, access controller 112 may determine if the firmware update action has completed. If the firmware update action has completed, method 900 may proceed to step 920. Otherwise, method 900 may proceed again to step 912.

At step 916, access controller 112 may cause a behavior associated with a powering-on or boot to be displayed by visual indicators 114. For example, in some embodiments, access controller 112 may cause all visual indicators 114 to generate solid green light in response to a power on/boot request.

At step 918, access controller 112 may determine if the power-on/boot action has completed. If the power-on/boot action has completed, method 900 may proceed to step 920. Otherwise, method 900 may proceed again to step 916.

At step 920, access controller 112 may cause a brand behavior illumination to be displayed by visual indicators 114. For example, each different brand, model, and/or type of information handling system 102 may have a respective behavior of color, intensity, blink frequency, and/or pattern for visual indicators 114 when in normal operation (e.g., operation outside of a faulted state or action request).

Figure 10:
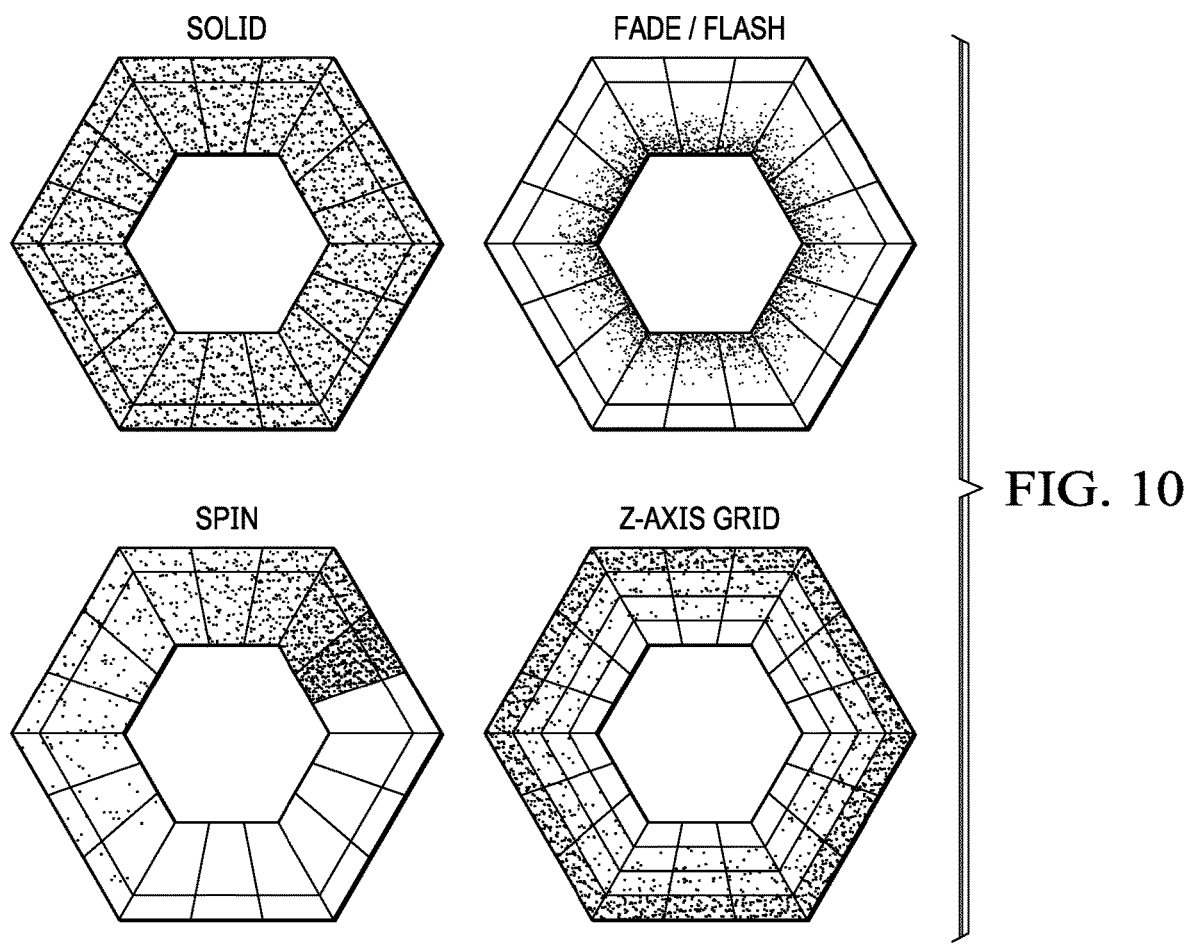
FIG. 10 illustrates brand behavior illuminations for an illuminated element module, in accordance with embodiments of the present disclosure.

Examples of brand behavior illuminations are shown in FIG. 10. For example, in a "solid" brand behavior, all sub-segments of segments 800 may steadily illuminate a single color. As another example, in a "fade/flash" brand behavior, all sub-segments of segments 800 may periodically flash (e.g., in a "breathing" manner that fades in and out) in a single color. As a further example, in a "spin" brand behavior, all sub-segments of segments 800 may continuously and sequentially illuminate in a single color to create the appearance of light "spinning" around illuminated element module 114. As an additional example, some embodiments of illuminated element module 114 may include sub-segments in a third dimension or "z-axis", in which sub-segments of segments 800 may continuously and sequentially illuminate in the z-axis.

Although FIG. 9 discloses a particular number of steps to be taken with respect to method 900, method 900 may be executed with greater or fewer steps than those depicted in FIG. 9. In addition, although FIG. 9 discloses a certain order of steps to be taken with respect to method 900, the steps comprising method 900 may be completed in any suitable order.

Method 900 may be implemented using information handling system 102 or any other system operable to implement method 900. In certain embodiments, method 900 may be implemented partially or fully in software and/or firmware embodied in computer-readable media.

While method 900 contemplates actions and action requests for firmware updates and powering-on/boot of information handling system 102, it is understood that other actions and action requests may take place in information handling system 102, for which access controller 112 may cause an illumination technique unique to such action to be displayed to visual indicators 114.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A bezel configured to mechanically couple to a housing for housing components of an information handling system, the bezel comprising:
    one or more mechanical features for mechanically coupling the bezel to the housing;
    an illumination module mechanically coupled to a mechanical structure of the bezel wherein the illumination module includes:
        a segmented light guide located within a light guide housing; and
        a printed circuit board, containing a plurality of visual indicators, covering a backside of the light guide housing; and
    a bezel connector having a plurality of pins communicatively coupled to the illumination module, the bezel connector configured to communicatively couple the illumination module to an access controller of the information handling system housed within the housing, such that the illumination module receives instructions from the access controller for causing the plurality of visual indicators to display a brand behavior illumination indicative of a brand characteristic of the information handling system.

2. The bezel of claim 1, wherein the plurality of visual indicators comprise an array of individually-addressable visual indicators such that in response to the instructions, each individually-addressable visual indicator displays behavior associated with the status.

3. The bezel of claim 1, wherein the illumination module comprises a plurality of segments such that in response to the instructions, each of the plurality of segments displays behavior associated with the status.

4. The bezel of claim 3, wherein the visual behavior comprises one or more of a pattern of illumination of the segments, a color of illumination of each of the segments, an intensity of illumination of each of the segments, and a frequency at which each of the segments is periodically illuminated.

5. The bezel of claim 1, wherein the status of the information handling system comprises a firmware update request and the visual behavior is unique to the firmware update request.

6. The bezel of claim 1, wherein the status of the information handling system comprises a powering-on or boot request and the visual behavior is unique to the powering-on or boot request.

7. The bezel of claim 1, wherein the status of the information handling system comprises a brand, model, or type of information handling system and the visual behavior is unique to the brand, model, or type.

8. An information handling system comprising:
    an access controller; and
    a housing configured to house the access controller, the housing comprising:
        one or more mechanical features for mechanically coupling a bezel to the housing; and a housing connector mechanically mounted on the housing and communicatively coupled to the access controller and configured to engage with a corresponding connector of the bezel in order to communicatively couple an illumination module mechanically coupled to the bezel to the access controller, such that the access controller is configured to communicate instructions to the illumination module for causing the plurality of visual indicators to display a brand behavior illumination indicative of a brand characteristic of the information handling system,
    wherein the illumination module includes:
    a segmented light guide located within a light guide housing; and a printed circuit board, containing a plurality of visual indicators, covering a backside of the light guide housing.

9. The information handling system of claim 8, wherein the one or more mechanical features is formed in an ear of the housing, and the housing connector is mechanically mounted to the ear.

10. The information handling system of claim 8, wherein the plurality of visual indicators comprise an array of individually-addressable visual indicators such that in response to the instructions, each individually-addressable visual indicator displays behavior associated with the status.

11. The information handling system of claim 10, wherein the illumination module comprises a plurality of segments such that in response to the instructions, each of the plurality of segments displays behavior associated with the status.

12. The information handling system of claim 11, wherein the visual behavior comprises one or more of a pattern of illumination of the segments, a color of illumination of each of the segments, an intensity of illumination of each of the segments, and a frequency at which each of the segments is periodically illuminated.

13. The information handling system of claim 8, wherein the status of the information handling system comprises a firmware update request and the visual behavior is unique to the firmware update request.

14. The information handling system of claim 8, wherein the status of the information handling system comprises a powering-on or boot request and the visual behavior is unique to the powering-on or boot request.

15. The information handling system of claim 8, wherein the status of the information handling system comprises a brand, model, or type of information handling system and the visual behavior is unique to the brand, model, or type.

\* \* \* \* \*